(12) United States Patent
Tjaden, Jr. et al.

(10) Patent No.: US 10,895,508 B1
(45) Date of Patent: Jan. 19, 2021

(54) SENSOR INSERT

(71) Applicant: Dickson/Unigage, Inc., Addison, IL (US)

(72) Inventors: Dean A. Tjaden, Jr., Elgin, IL (US); Steven J. Thompson, Aurora, IL (US); James D. Springer, Lyons, IL (US); Denise A. Alexander, Naperville, IL (US)

(73) Assignee: Dickson/Unigage, Inc., Addison, IL (US)

( * ) Notice: Subject to any disclaimer, the term of this patent is extended or adjusted under 35 U.S.C. 154(b) by 304 days.

(21) Appl. No.: 16/107,572

(22) Filed: Aug. 21, 2018

(51) Int. Cl.
| | | |
|---|---|---|
| *G01K 1/00* | | (2006.01) |
| *G01K 7/00* | | (2006.01) |
| *G01K 13/00* | | (2006.01) |
| *G01K 1/14* | | (2006.01) |

(52) U.S. Cl.
CPC .............. *G01K 1/14* (2013.01); *G01K 13/00* (2013.01)

(58) Field of Classification Search
USPC ....... 374/116, 208, 150, 138, 148, 135, 163, 374/157
See application file for complete search history.

(56) References Cited

U.S. PATENT DOCUMENTS

| | | | | |
|---|---|---|---|---|
| 2,930,827 A * | 3/1960 | Schunke | ................ | G01K 13/02 136/224 |
| 3,009,217 A * | 11/1961 | Weiner | .................. | B65D 51/24 206/212 |
| 4,966,469 A * | 10/1990 | Fraser | ....................... | F26B 5/06 34/284 |
| 5,133,392 A * | 7/1992 | Hamann | ............... | B01L 3/0262 141/1 |
| 5,447,374 A * | 9/1995 | Fraser | ................ | B01L 3/50825 215/227 |
| 6,076,963 A * | 6/2000 | Menzies | ................ | G01K 13/02 374/138 |
| 6,762,671 B2 * | 7/2004 | Nelson | ................... | G01K 7/223 338/25 |
| 7,520,670 B2 * | 4/2009 | Schwegman | ............ | F26B 5/06 215/200 |
| 7,798,704 B2 * | 9/2010 | Bard | ...................... | G01K 13/02 374/116 |
| 2009/0067475 A1 * | 3/2009 | Tavener | ............... | G01K 15/002 374/208 |

* cited by examiner

*Primary Examiner* — Mirellys Jagan
(74) *Attorney, Agent, or Firm* — Neustel Law Offices

(57) ABSTRACT

A sensor insert for positioning a temperature sensor within a glycol bottle. The sensor insert may be transparent and in the general shape of a tube, and is adapted for insertion in a bottle having an upper opening and a bottom. The sensor insert can also comprise an insert body having a first end, a second end and an inner surface. The insert body may be tapered from the first end toward the second end, for easy insertion into the bottle. The sensor insert can hold a temperature sensor away from the bottom and sides of the bottle to enable more accurate temperature readings. The insert also allows fluid within the bottle to be in contact with the temperature sensor due to fluid openings in the insert body.

17 Claims, 3 Drawing Sheets

SENSOR INSERT

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a sensor insert for holding a sensor within a sensor bottle away from the sides of the bottle.

Related Art

Any discussion of the related art throughout the specification should in no way be considered as an admission that such related art is widely known or forms part of common general knowledge in the field.

It is known to use glycol-encased probes to provide more accurate readings of actual vial temperatures (such as vaccine vial temperatures) where vaccines or other products are stored in a temperature-controlled environment. This is because the vaccines or other products themselves have more thermal mass than air, and using a probe encased in a fluid such as glycol having a similar thermal mass will more closely track the actual product temperature (even though the probe is not inserted into the product itself).

While better than using unencased probes, using probes encased in glycol bottles is still not ideal because the temperature sensing element can come into contact with the walls of the container. This may allow false or less accurate temperature readings or spikes that can result when the container is moved or handled if the temperature sensor comes into contact with the container walls.

SUMMARY

An example embodiment is directed to a sensor insert for a temperature sensor or other type of sensor. The sensor insert is adapted for insertion in a bottle having an upper opening and a bottom, and can comprise an insert body having a first end, a second end and an inner surface. The insert body may be tapered from the first end toward the second end, for easy insertion into the bottle. An example insert body further comprises a first cavity extending into the first end toward the second end, the first cavity comprising a first end opening proximate the first end of the insert body. In another example embodiment, the insert body may have a second cavity extending from the second end toward the first end, the second cavity comprising a second end opening proximate the second end. The first cavity can be in fluid communication with the second cavity.

In an example embodiment, the sensor insert may also have one, or a plurality of fluid openings in the insert body positioned between the first end and the second end, and can also include an inner support extending inwardly from the inner surface of the insert body and spaced apart from the second end, the inner support adapted to support a sensor element at a distance from the second end. The inner support may be in the form of a ring or other restriction in the inner cavity of the insert body. The inner support in some example embodiments may comprise an opening between the first cavity and the second cavity, the opening having an appropriate size to support the sensor element above the bottom of the bottle.

The sensor insert of an example embodiment may further comprise a substantially ring-shaped bottom surface adapted to be positioned on an inner surface of the bottle, such as the bottom of the bottle. The sensor insert may be substantially the same length as the inside of the bottle.

There has thus been outlined, rather broadly, some of the embodiments of the sensor insert in order that the detailed description thereof may be better understood, and in order that the present contribution to the art may be better appreciated. There are additional embodiments of the sensor insert that will be described hereinafter and that will form the subject matter of the claims appended hereto. In this respect, before explaining at least one embodiment of the Sensor insert in detail, it is to be understood that the sensor insert is not limited in its application to the details of construction or to the arrangements of the components set forth in the following description or illustrated in the drawings. The sensor insert is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 3:
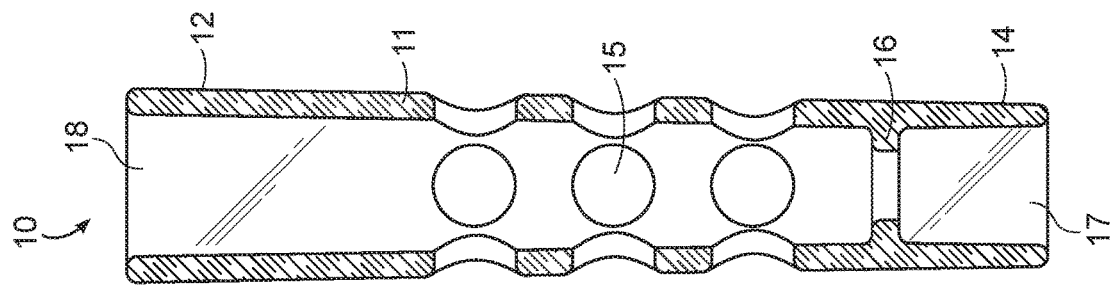
FIG. 3 is a sectional front view of a sensor insert in accordance with an example embodiment.
Figure 2:
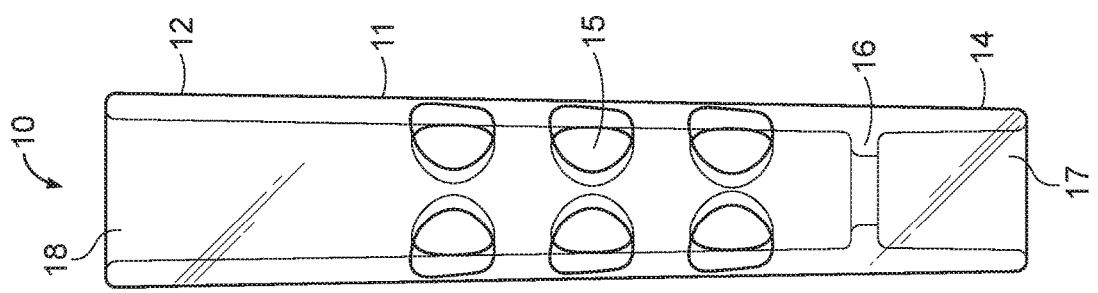
FIG. 2 is a front view of a sensor insert in accordance with an example embodiment.
Figure 1:
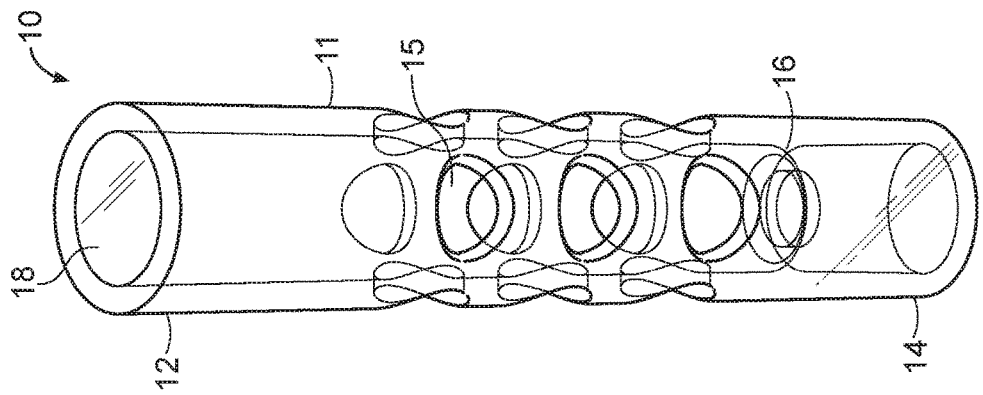
FIG. 1 is a perspective view of a sensor insert in accordance with an example embodiment.

An example sensor insert 10 for a temperature sensor 20 (or another type of sensor element) is adapted for insertion in a bottle 30 having an upper opening 31 and a bottom 33, and can comprise an insert body 11 having a first end 12, a second end 14, and an inner surface 19. An example embodiment further generally comprises an insert body 11 that may be tapered from the first end 12 toward the second end 14, for easy insertion into the bottle 32. An example insert body further comprises a first cavity extending into the first end 12 toward the second end 14, the first cavity comprising a first end opening 18 proximate the first end 12 of the insert body 11. In another example embodiment, the insert body 11 may have a second cavity extending from the second end 14 toward the first end 12, the second cavity comprising a second end opening 17 proximate the second end 14. The first cavity can be in fluid communication with the second cavity. To aid in positioning a sensor element and to inspect proper placement, the sensor insert 10 may be made from a transparent material, such as a transparent plastic.

In an example embodiment, the sensor insert 10 may also have one, or a plurality of fluid openings 15 in the insert body positioned between the first end 12 and the second end 14, and can also include an inner support 16 extending inwardly from the inner surface 19 of the insert body and spaced apart from the second end 14, the inner support 16 adapted to support a sensor element 20 at a distance from the second end 14. The inner support may be in the form of a ring or other restriction in the inner cavity of the insert body 11. The inner support 16 in some example embodiments may comprise an opening between the first cavity and the second cavity, the opening having an appropriate size to support the sensor element above the bottom of the bottle and allowing fluid communication between the first cavity and the second cavity.

The sensor insert 10 of an example embodiment may further comprise a substantially ring-shaped bottom surface adapted to be positioned on an inner surface 33 of the bottle, such as the bottom of the bottle. The sensor insert 10 may be substantially the same length as the inside of the bottle.

B. Insert Body

Figure 4:
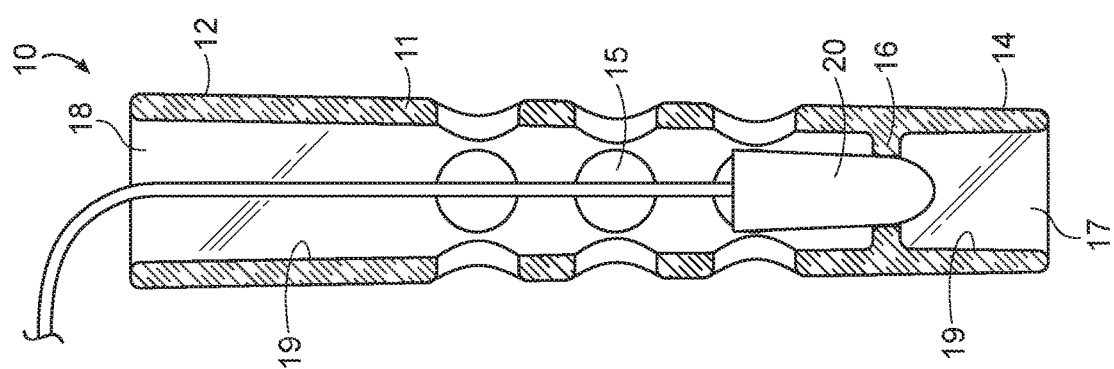
FIG. 4 is a sectional front view of a sensor insert with a sensor element in place, in accordance with an example embodiment.
Figure 6:
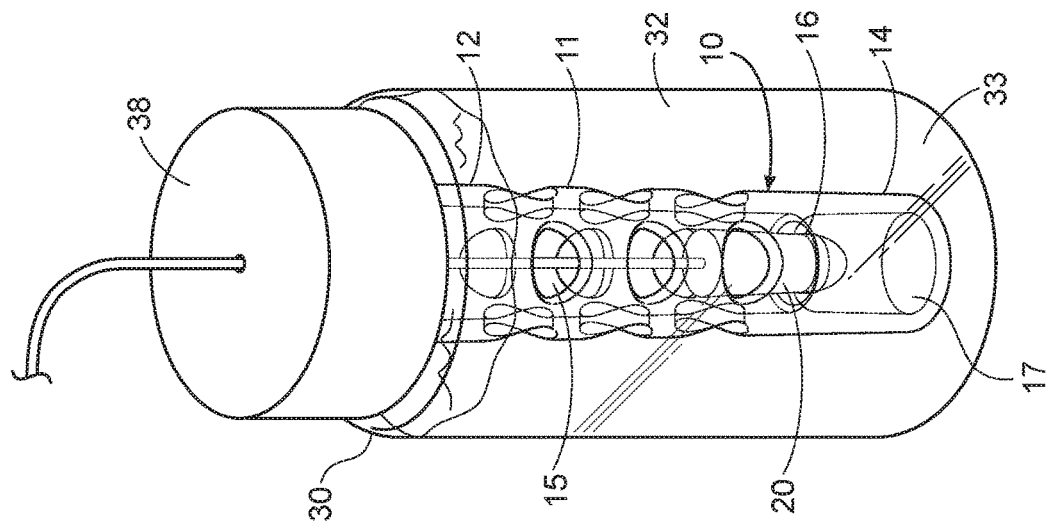
FIG. 6 is a perspective view of a sensor insert within a capped bottle with a sensor element in place, in accordance with an example embodiment.

As best shown in FIGS. 1-4, an example sensor insert 10 for a temperature sensor 20 (or another type of sensor element) is adapted for insertion into the opening of a bottle 30 having an upper opening 31 and a bottom 33. The sensor insert may typically comprise an insert body 11 having a first end 12, a second end 14, and an inner surface 19. The sensor insert may also comprise an insert body 11 that may be tapered from the first end 12 toward the second end 14, for easy insertion into the bottle 30. The sensor insert 10 may be made of a transparent material, such as, but not limited to, a transparent plastic. Because the sensor insert 10 and the bottle 30 may be transparent, it is easy for a user to verify that a sensor element is properly positioned within the sensor insert 10 and correspondingly, within the bottle 30, as shown in FIG. 4 and FIG. 6.

As shown generally throughout the Figures, the sensor insert may be generally in the shape of a tapered, substantially cylindrical tube with an inner support 16, although other shapes would work as well, and could serve the same purpose. For example, the overall shape of the sensor insert 10 is not critical, and could be a square tube or another suitable shape. Clearly, such shapes could serve the purpose of holding a sensor element 20 away from the sides and bottom of a sensor bottle 30 while allowing fluid contact with the sensor.

Figure 7:
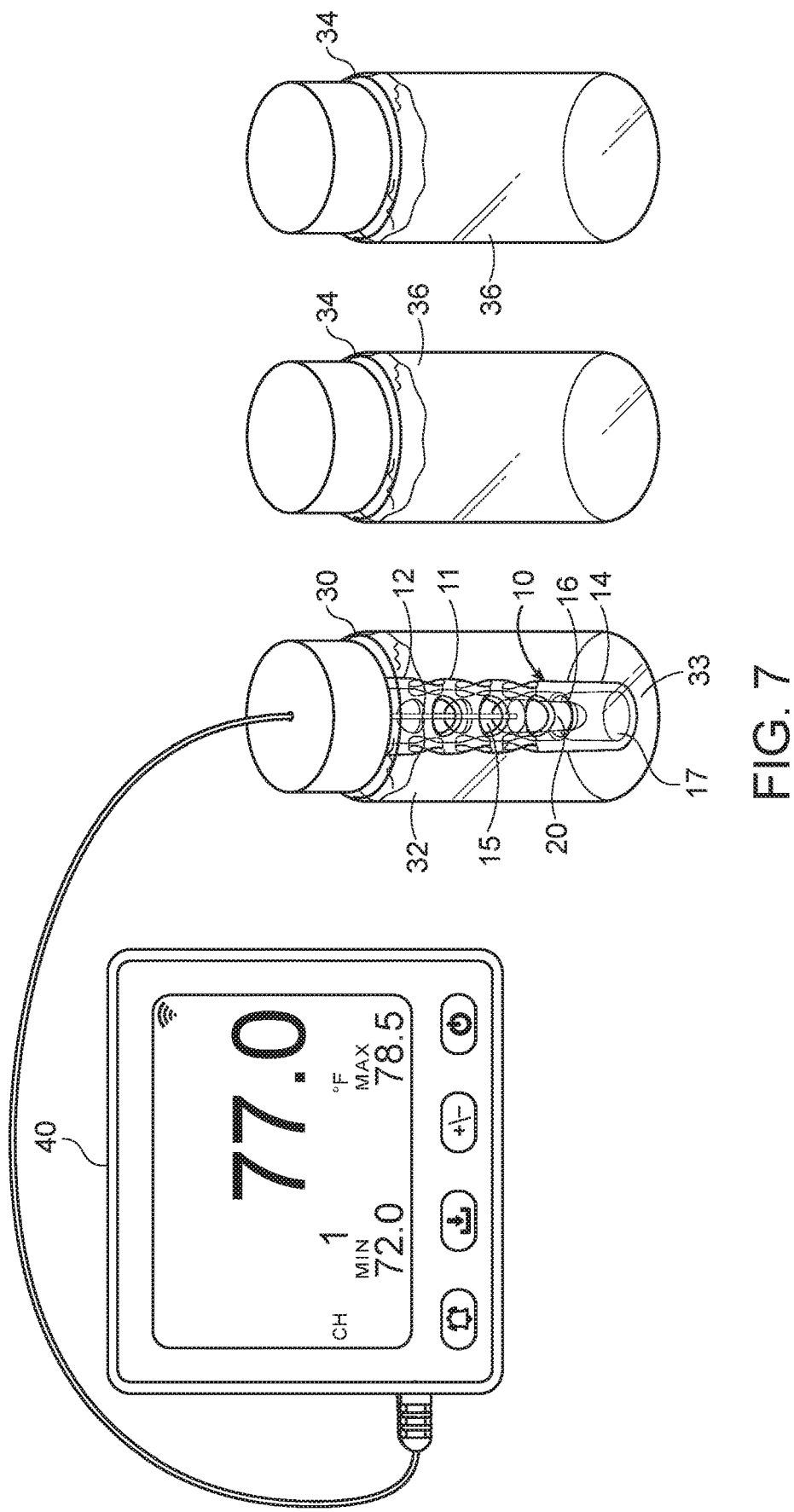
FIG. 7 is a perspective view of a sensor insert within a system, in accordance with an example embodiment.

An example insert body 11 may further comprise a first cavity extending into the first end 12 toward the second end 14, the first cavity comprising a first end opening 18 proximate the first end 12 of the insert body 11. In another example embodiment, the insert body 11 may have a second cavity extending from the second end 14 toward the first end 12, the second cavity comprising a second end opening 17 proximate the second end 14. The first cavity can be in fluid communication with the second cavity. As shown in FIG. 4, a temperature sensor element 20 can be positioned in the sensor insert 10, supported above the bottom of the insert by inner support 16, which is appropriately sized and positioned to ensure that the sensor is held as shown in FIGS. 4 and 6. As shown, the sensor is thus in fluid contact with a buffer fluid 32 in the bottle 30, such as glycol or other liquid. The sensor element 20, in addition to being positioned above the bottom of the bottle, is also held away from the sides of the bottle 30, which will prevent or reduce erroneous readings, and more accurately reflect the actual fluid temperature in the bottle 30, which in turn will be a more accurate approximation of the fluid temperature of actual liquids 36 in bottles or vials stored in proximity to the bottle 30 with the temperature sensor 20, as shown in FIG. 7.

As shown in FIGS. 1-6, the sensor insert 10 may also have one, or a plurality of fluid openings 15 in the insert body 11 positioned between the first end 12 and the second end 14, and can also include an inner support 16 extending inwardly from the inner surface 19 of the insert body and spaced apart from the second end 14, the inner support 16 adapted to support a sensor element 20 at a distance from the second end 14. The inner support 16 may be in the form of a ring or other restriction in the inner cavity of the insert body 11. The inner support 16 in some example embodiments may comprise an opening between the first cavity and the second cavity, the opening having an appropriate size to support the sensor element 20 above the bottom 33 of the bottle and allowing fluid communication between the first cavity and the second cavity.

Figure 5:
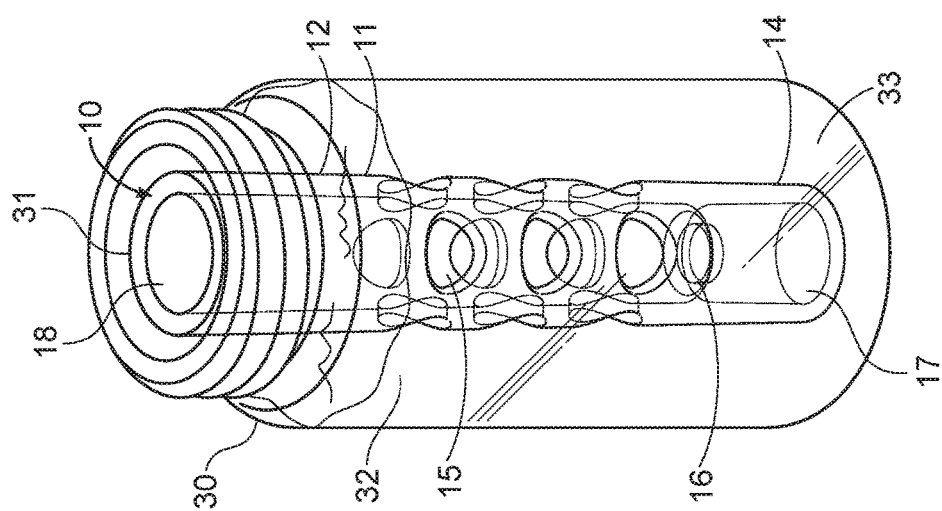
FIG. 5 is a perspective view of a sensor insert within a bottle in accordance with an example embodiment.

The sensor insert 10 of an example embodiment may further comprise a substantially ring-shaped bottom surface adapted to be positioned on an inner surface 33 of the bottle, such as the bottom of the bottle. The insert 10 may have a similar ring shaped upper surface. The sensor insert 10 may be substantially the same length as the inside of the bottle and have a diameter such that the upper end 12 of the insert 10 fits closely within the neck of bottle 30 when inserted into the bottle. As shown in FIGS. 5 and 6, due to the length and diameter of the insert 10 and the ring-shaped surfaces in contact with the inside of the cap 38 and the bottom surface 33 of the bottle, when the cap 38 of the bottle 30 is in place, the sensor insert 10 is held in place as shown, and will not tilt or move very much, if at all. Accordingly, both the insert 10 and the sensor element 20 will remain in place as shown in FIGS. 6 and 7 even when bottle 30 is moved or disturbed.

C. Inner Support

As best shown in FIG. 4, the sensor insert 10 may have an inner support 16. In the specific example embodiment shown, the inner support 16 is in the form of a reduced-diameter section or portion of insert body 11 that extends into the cavity of the insert from the inner surface 19 of the insert body 11. As also shown, the inner support 16 may comprise a central opening, into which a sensor, such as a temperature sensor element 20, may be positioned. In the embodiment shown, the sensor element 20 may have a taper, such that the tip, or end, of the sensor extends through the opening in the inner support 16 and into the lower cavity formed by the tubular insert body 11. As an alternative, the inner support could also lack such an opening, and the insert 10 would still perform its functions as described here. This is because the fluid 32 within the sensor bottle 30 would still be in contact with sensor 20, via fluid openings 15 in the insert body 11.

As also shown best in FIG. 7, a wire connecting sensor 20 to a measurement/data logging unit may extend through the cavity that extends from the first end 12 of the sensor insert 10 toward the second end 14. The wire may exit a sealed opening in the cap 38 of the bottle 30 and be routed to an instrument such as data unit 40.

D. Operation of Preferred Embodiment

In use, a bottle 30 containing glycol 32 or other liquid may be positioned in relatively close proximity to other bottles 34 containing liquid products 36 whose temperature is being monitored. For example, the system illustrated in FIG. 7 may be representative of a vaccine storage system, in accordance with the recommendations of the CDC. For example, inactivated vaccines must be stored in a controlled environment between 36° and 46° F., and freezing must also be avoided. The CDC recommends that vaccines under storage should be monitored continuously with a data unit that also has an active display, such as data unit 40. A unit such as data unit 40 should also be capable of recording temperatures at various intervals, and should also provide for display or recall of maximum and minimum temperatures reached since the last reading, or over a given interval or period.

The CDC also recommends using glycol-encased probes to provide temperature measurements that more accurately reflect the actual temperatures of vaccine vials when such probes are placed near where the vaccines are stored, as shown in FIG. 7. Like the glycol-filled bottle, vaccines have greater thermal stability than the surrounding air, due to their thermal mass. Using encased probes to approximate the temperature of vaccines or other products prevents inaccurate or misleading readings, false temperature alarms, etc., that would otherwise occur due to opening and closing the door of a storage unit, air circulation, etc.

To use the sensor insert, the insert may typically be inserted into a nearly full glycol bottle, which may be the same size as the target bottles or vials, as shown in FIG. 7. Then, a temperature sensor 20 may be inserted through an opening in the cap of the bottle and the sensor element positioned within the sensor insert 10, and resting on the inner support 16. The cap can then be replaced, resulting in the embodiment shown in FIG. 6. Because the bottle 30 and the insert 10 are both transparent, a user can readily determine whether or not the sensor element 20 is positioned as it should be. When it is so positioned, the system improves on the performance of a simple glycol-encased probe by ensuring that the temperature sensor element 20 is not only within the glycol, but that it is not in contact with any part of the bottle 30, such as the walls or the bottom.

As best shown in FIG. 5, the sensor insert 10 is sized to fit relatively closely within the glycol bottle, both in length and diameter. Thus, when the cap 38 is screwed onto the bottle 30, the sensor insert 10 is held securely in place, and cannot move or tilt in the bottle. This is due to the fact that the bottom surface of the insert will be in contact with the bottom, inside surface 33 of the bottle, while at the same time, the top surface of the insert will be in contact, or nearly in contact, with the inside surface of cap 38. In addition, the diameter of the top of the insert 10 provides a close fit within the neck of bottle 30, which further insures that the insert 10 and correspondingly, the sensor element 20, will remain positioned within the bottle 30 as shown in FIGS. 6 and 7.

Unless otherwise defined, all technical and scientific terms used herein have the same meaning as commonly understood by one of ordinary skill in the art to which this invention belongs. Although methods and materials similar to or equivalent to those described herein can be used in the practice or testing of the sensor insert, suitable methods and materials are described above. All publications, patent applications, patents, and other references mentioned herein are incorporated by reference in their entirety to the extent allowed by applicable law and regulations. The sensor insert may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A sensor insert adapted for insertion in a bottle having an upper opening and a bottom, comprising:
    an insert body having a first end, a second end, and an inner surface;
    wherein the insert body further comprises a cavity forming the inner surface and extending into the first end toward the second end, the cavity comprising a first end opening proximate to the first end, a substantially ring-shaped second end adapted to be positioned on an inner surface of the bottom of the bottle;
    a fluid opening in a side of the insert body positioned between the first end and the second end; and
    an inner support extending inwardly from the inner surface of the insert body and spaced from the second end, the inner support being adapted to support a sensor element at a distance from the second end.

2. The sensor insert of claim 1, wherein the fluid opening comprises a plurality of fluid openings.

3. The sensor insert of claim 1, wherein the sensor insert further comprises a substantially ring-shaped upper surface.

4. The sensor insert of claim 1, wherein the insert body comprises a transparent material.

5. A sensor insert adapted for insertion in a bottle having an upper opening and a bottom, comprising:
    an insert body having a first end, a second end, and an inner surface, wherein the insert body is substantially the same length as an inside of the bottle;
    wherein the insert body further comprises a cavity forming the inner surface and extending into the first end toward the second end, the cavity comprising a first end opening proximate to the first end,
    a fluid opening in a side of the insert body positioned between the first end and the second end; and
    an inner support extending inwardly from the inner surface of the insert body and spaced from the second end, the inner support being adapted to support a sensor element at a distance from the second end.

6. A sensor insert adapted for insertion in a bottle having an upper opening and a bottom, comprising:
    an insert body having a first end, a second end, and an inner surface;
    wherein the insert body further comprises a first cavity forming a part of the inner surface and extending into the first end toward the second end, the first cavity comprising a first end opening proximate to the first end, and wherein the insert body comprises a second cavity also forming a part of the inner surface and extending from the second end toward the first end, the second cavity comprising a second end opening proximate to the second end;
    a fluid opening in a side of the insert body positioned between the first end and the second end; and
    an inner support extending inwardly from the inner surface of the insert body and forming a part of the first and second cavities and spaced from the second end, the inner support being adapted to support a sensor element at a distance from the second end.

7. The sensor insert of claim 6, wherein the first cavity is in fluid communication with the second cavity.

8. The sensor insert of claim 7, wherein the inner support comprises an opening between the first cavity and the second cavity.

9. A sensor insert adapted for insertion in a bottle having an upper opening and a bottom, comprising:
- an insert body having a first end, a second end, and an inner surface, the insert body being tapered from the first end toward the second end;
- wherein the insert body further comprises a cavity forming a part of the inner surface and extending into the first end toward the second end, the cavity comprising a first end opening proximate to the first end;
- a substantially ring-shaped second end adapted to be positioned on an inner surface of the bottom of the bottle;
- a fluid opening in a sude if the insert body positioned between the first end and the second end; and
- an inner support extending inwardly from the inner surface of the insert body and spaced from the second end, the inner support being adapted to support a sensor element at a distance from the second end.

10. The sensor insert of claim 9, wherein the insert body is substantially the same length as the bottle.

11. The sensor insert of claim 9, wherein the fluid opening comprises a plurality of fluid openings.

12. The sensor insert of claim 9, wherein the sensor insert further comprises a substantially ring-shaped upper surface.

13. The sensor insert of claim 9, wherein the insert body comprises a transparent material.

14. The sensor insert of claim 9, wherein the insert body comprises a second cavity also forming a part of the inner surface and extending from the second end toward the first end, the second cavity comprising a second end opening proximate to the second end.

15. The sensor insert of claim 14, wherein the first cavity is in fluid communication with the second cavity.

16. The sensor insert of claim 15, wherein the inner support comprises an opening between the first cavity and the second cavity.

17. The sensor insert of claim 16, wherein the inner support is further adapted to support an end of the sensor element at a distance from the second end within the second cavity.

* * * * *